Patented Nov. 2, 1926.

1,605,130

UNITED STATES PATENT OFFICE.

GROVER C. MILLER, OF SOUTH PASADENA, CALIFORNIA.

CHEMICAL PROCESS.

No Drawing.  Application filed June 28, 1926. Serial No. 119,237.

This invention relates to chemical processes and is more particularly directed to a process of producing an agar liquid petrolatum emulsion to be used as a laxative and in which an acid is employed for reducing the viscosity of the agar-agar liquid petrolatum mixture.

This application is a continuation in part of a former application heretofore filed by me for chemical processes, Serial No. 694,770, filed February 23, 1924.

In practicing this process, a quantity of agar-agar is converted into a solution by boiling the same in water until thoroughly dissolved, whereupon an acid, either in the form of crystals or as a concentrated aqueous solution, is introduced into the solution to reduce it to a thin liquid, preferably of approximately the fluidity of water. To the mixture produced, a quantity of heavy mineral oil is added, and then preservatives and flavoring matter are introduced, and the whole mass thus obtained is boiled for a short period of time until intermingled.

With the aforesaid ingredients intermingled at a raised temperature, the same is subjected to a thorough agitation, during which period a volume of heavy oil, preferably equal to that initially introduced, is added, and the agitation is continued until the bulk is cool. During the agitation and the addition of the second quantity of mineral oil, additional quantities of flavoring and hexamethylenetetramine may be added. The boiling of agar-agar with water to which the acid is added, produces a solution containing a great bulk of agar-agar in a very fluid solution.

The acid which is preferably added to the agar-agar and water during the first step of this process, that is, the boiling of agar-agar with water, is not for the purpose of an additional flavoring but changes the agar-agar from a jelly-like solution, which would be prepared by merely boiling agar-agar with water, to a water-thin solution which emulsifies with greater ease with the mineral oil, eliminating the necessity of adding to the solution emulsifying agents, such as gums or the like.

As an example of medical compound prepared by this method, the following proportions are set forth for the preparation of one pint of medical compound:

Agar-agar, 240 grains; citric acid, 10 grains; heavy mineral oil, 8 ounces; sodium benzoate, 20 grains; hexamethylenetetramine, 20 grains; boric acid, 10 grains; sodium chloride, 10 grains; saccharin, 1½ grains; vanillin, 3 grains; oil of lemon tincture (72% alcohol), 2 drams, and water, approximately 7½ ounces.

The fluidification of the mixture is effected by the hydrogen ions yielded in the dissociation of the acid added to the agar solution. In the preparation of my composition, citric acid or lactic acid may be advantageously employed, but my invention is not limited to these acids; and any other acid may be used with equally good results.

Having fully described a preferred embodiment of this invention, it is to be understood that I do not wish to be limited to the exact details herein set forth, or the proportions herein employed, which may obviously be varied without departing from the spirit of my invention as set forth in the appended claims.

I claim:

1. A process of the character set forth, consisting of converting a quantity of agar-agar into a solution by boiling it in water, thinning the solution by the introduction of an acid therein, introducing sodium chloride, acid boric, sodium benzoate, saccharin and vanillin into the solution, introducing a volume of heavy mineral oil, boiling the mixture, agitating the mixture a short time thereafter, adding an equal volume of heavy mineral oil, a quantity of hexamethylenetetramine and flavoring, and agitating the mixture until cool.

2. A process of the character described, consisting of boiling a quantity of agar-agar in water and reducing its viscosity with an acid, adding sodium chloride, acid boric, sodium benzoate, saccharin and vanillin, introducing a heavy mineral oil into the aforesaid mixture and boiling it a few minutes, subjecting the mixture thus obtained to a thorough agitation, further adding an equal volume of oil, a quantity of hexamethylenetetramie and lemon flavoring and continuing the agitation after such additions.

3. A process of the character set forth consisting of converting agar-agar into a solution by boiling it in water, thinning the solution with an acid, adding other ingredients, boiling the mixture with a volume of heavy mineral oil, agitating the same, adding a volume of oil, a quantity of hexamethylenetetramine and flavoring, and again agitating the mixture until the temperature thereof is lowered.

4. A process of the character set forth, consisting of converting agar-agar into a solution and reducing its viscosity with an acid, adding sodium chloride, acid boric, sodium benzoate, saccharin, and vanillin, introducing a volume of heavy mineral oil therein and agitating the mixture, introducing a volume of heavy mineral oil therein, together with a quantity of hexamethylenetetramine and flavoring, and again agitating the mixture.

5. A process of producing an agar liquid petrolatum emulsion which comprises adding a water solution of an acid to agar-agar, boiling the mixture, adding a preservative and a flavoring, combining the solution with a mineral oil, and agitating the mixture so prepared until cool.

6. A process of producing an agar liquid petrolatum emulsion which comprises boiling the agar in water to which an acid has been added, adding a preservative to the solution, adding liquid petrolatum, and agitating the mixture.

7. A process of producing an agar liquid petrolatum emulsion which comprises boiling agar in water, adding an acid to the boiling mixture of agar and water, adding a mineral oil in suitable quantities thereto, and agitating the mixture until it is cool.

Signed at Los Angeles, California, this 22 day of June, 1926.

GROVER C. MILLER.